US008428438B2

(12) United States Patent
Wolfe et al.

(10) Patent No.: US 8,428,438 B2
(45) Date of Patent: Apr. 23, 2013

(54) APPARATUS FOR VIEWING TELEVISION WITH PAUSE CAPABILITY

(75) Inventors: Andrew L. Wolfe, Los Gatos, CA (US); Edward J. Brachocki, Scottsdale, AZ (US); Stephen G. Maine, Paradise Valley, AZ (US); Christopher W. Chevalier, Tempe, AZ (US); Christopher L. Porter, Scottsdale, AZ (US)

(73) Assignee: The DIRECTV Group, Inc., El Segundo, CA (US)

( * ) Notice: Subject to any disclaimer, the term of this patent is extended or adjusted under 35 U.S.C. 154(b) by 1360 days.

(21) Appl. No.: 10/396,229

(22) Filed: Mar. 24, 2003

(65) Prior Publication Data

US 2004/0128692 A1 Jul. 1, 2004

Related U.S. Application Data

(60) Provisional application No. 60/392,872, filed on Jun. 28, 2002.

(51) Int. Cl.
*H04N 5/92* (2006.01)
*H04N 5/93* (2006.01)

(52) U.S. Cl.
USPC .......................................... 386/326; 386/353

(58) Field of Classification Search ................ 386/1, 33, 386/46, 111, 112, 326, 328, 329, 353, 354, 386/355, 356; 348/571, 714
See application file for complete search history.

(56) References Cited

U.S. PATENT DOCUMENTS

| 4,821,121 | A |   | 4/1989  | Beaulier ................... 358/160    |
| 5,126,982 | A |   | 6/1992  | Yifrach ....................... 369/7   |
| 5,241,428 | A |   | 8/1993  | Goldwasser et al. ............ 360/7    |
| 5,438,423 | A |   | 8/1995  | Lynch et al.                            |
| 5,787,388 | A | * | 7/1998  | Hayata .................... 704/215     |
| 5,801,786 | A | * | 9/1998  | Song ......................... 348/564  |
| 5,892,536 | A | * | 4/1999  | Logan et al. ................. 725/34   |
| 5,986,692 | A |   | 11/1999 | Logan et al. ................. 348/13   |
| 5,987,213 | A | * | 11/1999 | Mankovitz et al. ............. 386/83   |

(Continued)

FOREIGN PATENT DOCUMENTS

| JP | 6-284364 | 10/1994 |
| JP | 7-107439 | 4/1995  |

(Continued)

OTHER PUBLICATIONS

Notice of Reasons for Rejection from corresponding Japanese Office Action including Prior Art Search Report, 3 pages, Japanese application No. 2004-518234.

(Continued)

*Primary Examiner* — Robert Chevalier
(74) *Attorney, Agent, or Firm* — McDonnell Boehnen Hulbert & Berghoff LLP

(57) ABSTRACT

A television has an encoder, a random access memory buffer, and a decoder in addition to components of a conventional television receiver. The encoder encodes television signals to a digital format and the random access memory buffer stores the encoded television signal in response to activation of a pause function. The random access memory buffer outputs the stored digital television signal and the decoder decodes the digital television signal output from the random access memory buffer in response to deactivation of the pause function.

45 Claims, 6 Drawing Sheets

U.S. PATENT DOCUMENTS

| | | | |
|---|---|---|---|
| RE36,801 E | 8/2000 | Logan et al. | 348/571 |
| 6,233,389 B1 * | 5/2001 | Barton et al. | 386/46 |
| 6,374,040 B2 | 4/2002 | Mizoguchi et al. | 386/125 |
| 6,404,977 B1 | 6/2002 | Iggulden | |
| 6,631,403 B1 * | 10/2003 | Deutsch et al. | 709/217 |
| 6,736,593 B2 | 5/2004 | Namiki et al. | |
| 6,784,804 B1 * | 8/2004 | Hayes et al. | 340/825.22 |
| 6,801,707 B1 * | 10/2004 | Harumoto et al. | 386/329 |
| 2002/0141431 A1 * | 10/2002 | Tripathy | 370/428 |
| 2003/0063893 A1 | 4/2003 | Read | |

FOREIGN PATENT DOCUMENTS

| | | |
|---|---|---|
| JP | 7-130150 | 5/1995 |
| JP | 8-181928 | 7/1996 |
| JP | 2000-201302 | 7/2000 |
| JP | 2000-339857 | 12/2000 |
| JP | 2001-24790 | 1/2001 |
| JP | 2001-93230 | 3/2001 |
| JP | 2002-152652 | 5/2002 |
| JP | 2002233040 | 8/2002 |
| JP | 2002-295398 | 10/2002 |
| WO | WO99/33265 | 7/1999 |

OTHER PUBLICATIONS

International Search Report from corresponding International Application No. PCT/US2003/020974 (WO2004/004129 A3).

European Search Report, European Patent Application 03762331.1 dated Jul. 19, 2010.

Communication from European Patent Office, European Application No. 03762331.1 dated Dec. 21, 2010.

* cited by examiner

APPARATUS FOR VIEWING TELEVISION WITH PAUSE CAPABILITY

CROSS-REFERENCE TO RELATED APPLICATIONS

This application claims priority under 35 U.S.C. §119(e) to U.S. Provisional Patent Application No. 60/392,872, entitled "Apparatus for Viewing Television with Pause Capability," filed on Jun. 28, 2002, the subject matter of which is incorporated by reference herein in its entirety.

TECHNICAL FIELD

The present invention relates generally to an apparatus for viewing television, and more specifically, to an apparatus for viewing television with pause capability.

BACKGROUND OF THE INVENTION

Televisions have become common in our daily lives. Almost every household has multiple televisions and uses them for a variety of purposes such as watching news, soap operas, sports events and the like. Television users sometimes would like the televisions to have the capabilities to delay a program for later viewing ("pause") during transmission by the broadcast center. Pause capability herein means that a particular scene of a television program is paused during transmission by the broadcast center and television scenes broadcast subsequent to the paused scene are stored for delayed viewing. With pause capability, the television scenes subsequent to the particular scene that was paused are stored and shown on the television receiver after a user deactivates the pause function. There is no loss of the subsequent scenes received by the television while the pause function was activated.

Conventional television receivers lack the capability of pause because they have no means to temporarily store the broadcast television signal. In other words, the television broadcast signal is displayed on conventional television receivers as it is received without being stored anywhere.

Conventional video cassette recorders (VCRs) may provide a pause-like function in conjunction with a conventional television, but the pause-like function of conventional VCRs does not delay and store television signals received at the tuner, but rather stops the video tape play of recorded television programs. That is, conventional VCRs have to first record the television programs on a videotape while a television program is being broadcast, and later the playing of the tape and thus the output of the signal can be paused. In addition, conventional VCRs record the television programs in analog format on analog videotape, so the video quality is not good and will deteriorate even further as the videotape is played repeatedly. Furthermore, videotapes cannot be used more than a certain number of times to record and erase video content. Thus, video tapes have to be replaced after being used a certain number of times.

Likewise, conventional digital video recorders (DVRs) may also provide a pause-like function in conjunction with a conventional television, but the pause-like function of conventional DVRs does not delay and store television signals received at the tuner, but rather stops the play of television programs recorded on the storage media. That is, conventional VCRs have to first record the television programs on a storage media while a television program is being broadcast, and later the playing of the tape and thus the output of the television signal is paused.

Therefore, there is a need for an apparatus for viewing television with pause capability. There is also a need for an apparatus for viewing television with pause capability wherein the television signals are temporarily stored in digital format such that the image quality does not deteriorate as it is replayed. There is also a need for an apparatus for viewing television with capability wherein the television signals are stored in a medium that can be almost permanently used without having to replace the storage medium.

SUMMARY OF INVENTION

The present invention provides an apparatus for viewing television (TV) with pause capability. In one embodiment, the apparatus is a television with pause capability. The television of the present invention has a receiver that receives and tunes the television signal, a delay unit that temporarily stores the received television signal when the pause function is activated, and a display unit for displaying either the stored television signal or a live television signal. The receiver, the delay unit, and the display unit are integrated into a single housing, such that the apparatus for viewing TV with pause capability of the present invention is one apparatus in a single housing. The housing has control switches (e.g., activate pause, deactivate pause) to control the operation of the apparatus. The apparatus for viewing television may also receive control signals from a remote control device or may receive control signals over a data communication network such as the Internet. The apparatus of the present invention can be embodied in various conventional designs of televisions, video cassette recorders, and digital video disk players.

In an alternative embodiment, the television comprises an encoder, a random access memory buffer, a decoder, and a controller, in addition to conventional components of a conventional television. The encoder encodes the television signal received by the television to a digital format and the encoded television signal is temporarily stored in the random access memory buffer while the pause function is activated. The decoder decodes the encoded television data stored in the random access memory buffer to an analog format compatible with conventional displays and speakers. In an alternative embodiment, the decoder may also output the television data in digital formats such as those compatible with digital audio outputs on DVD players or DVI-type connections on digital televisions. The controller causes the encoder to start encoding the television signal and the random access memory buffer to start storing the encoded television signal when the pause function is activated. The controller also causes the decoder to start decoding and the random access memory buffer to output the stored television data to the decoder when the pause function is deactivated and the user wants to view the stored television scenes. All the components in the television of the present invention are integrated into a single housing. The housing has control switches (e.g., activate pause, deactivate pause) to control the operation of the television.

In another embodiment of the present invention, the apparatus is a digital video disk (DVD) player with pause TV capability. The TV signal is input to the DVD player. The DVD player of the present invention comprises a tuner, an encoder, a random access memory buffer, and a controller in addition to conventional components of a conventional DVD player. Since conventional DVD players typically have an MPEG decoder, the DVD player of the present invention does not need to include a separate MPEG decoder. The encoder encodes television data received by the DVD player to an MPEG format (or other compressed video/audio formats) so that the MPEG-encoded television data can be temporarily stored in the random access memory buffer while the pause function is activated. The decoder decodes the MPEG television data to an analog format (or digital video/audio format) compatible with conventional displays and speakers. The controller causes the encoder to start encoding the television data and the random access memory buffer to start storing the encoded television data when the pause function is activated. The controller also causes the decoder to start decoding and the random access memory buffer to output the stored television data to the decoder when the pause function is deactivated and the user wants to view the stored television scenes. All the components in the DVD player of the present invention are integrated into a single housing. The housing has control switches (e.g., activate pause, deactivate pause) to control the operation of the DVD player. A separate remote control device may also have such control switches. In another embodiment, the controller may cause the DVD player to always encode and store the television data regardless of whether or not the pause function is activated. In such case, the DVD player merely switches to decode and display the stored television data in response to deactivation of the pause function.

In still another embodiment of the present invention, the apparatus is a video cassette recorder (VCR) with capability to pause TV while the TV signal is received by the VCR. The VCR of the present invention comprises an encoder, a random access memory buffer, a decoder and a controller in addition to conventional components of a conventional VCR. Since conventional VCRs typically have TV tuners, the VCR of the present invention does not need to include a separate tuner. The encoder encodes television data received by the VCR to a digital format so that the encoded television data can be temporarily stored in the random access memory buffer while the pause function is activated. The decoder decodes the encoded television data to an analog format (or digital format) compatible with conventional displays and speakers. The controller causes the encoder to start encoding the television signal and the random access memory buffer to start storing the encoded television signal when the pause function is activated. The controller also causes the decoder to start decoding and the random access memory buffer to output the stored television data to the decoder when the pause function is deactivated and the user wants to view the stored television scenes. All the components in the VCR of the present invention are integrated into a single housing. The housing has control switches (e.g., activate pause, deactivate pause) to control the operation of the VCR.

Since the television receiver, DVD player, and the VCR of the present invention stores television data in digital format while the pause function is activated, subsequent television scenes received while the pause function is activated are not lost and can be viewed after the pause function is deactivated. Storage of the digital television data occurs while the pause function is activated. The present invention also has the advantage that the image quality will not deteriorate when later viewed after the pause function is deactivated, since the television data is stored in a digital format. Furthermore, the MPEG television data is stored in a random access memory, which is non-spinning media having the advantages of reduced heat, better reliability, and fast speed. Finally, the receiver, DVD player, and the VCR of the present invention are integrated into a single housing, and thus they are user-friendly (users do not have to deal with combining multiple devices) and can be manufactured at a low cost using various integration technology such as SOC (system-on-chip) technology.

BRIEF DESCRIPTION OF THE DRAWINGS

The teachings of the present invention can be readily understood by considering the following detailed description in conjunction with the accompanying drawings.

DETAILED DESCRIPTION OF EMBODIMENTS

Figure 1:
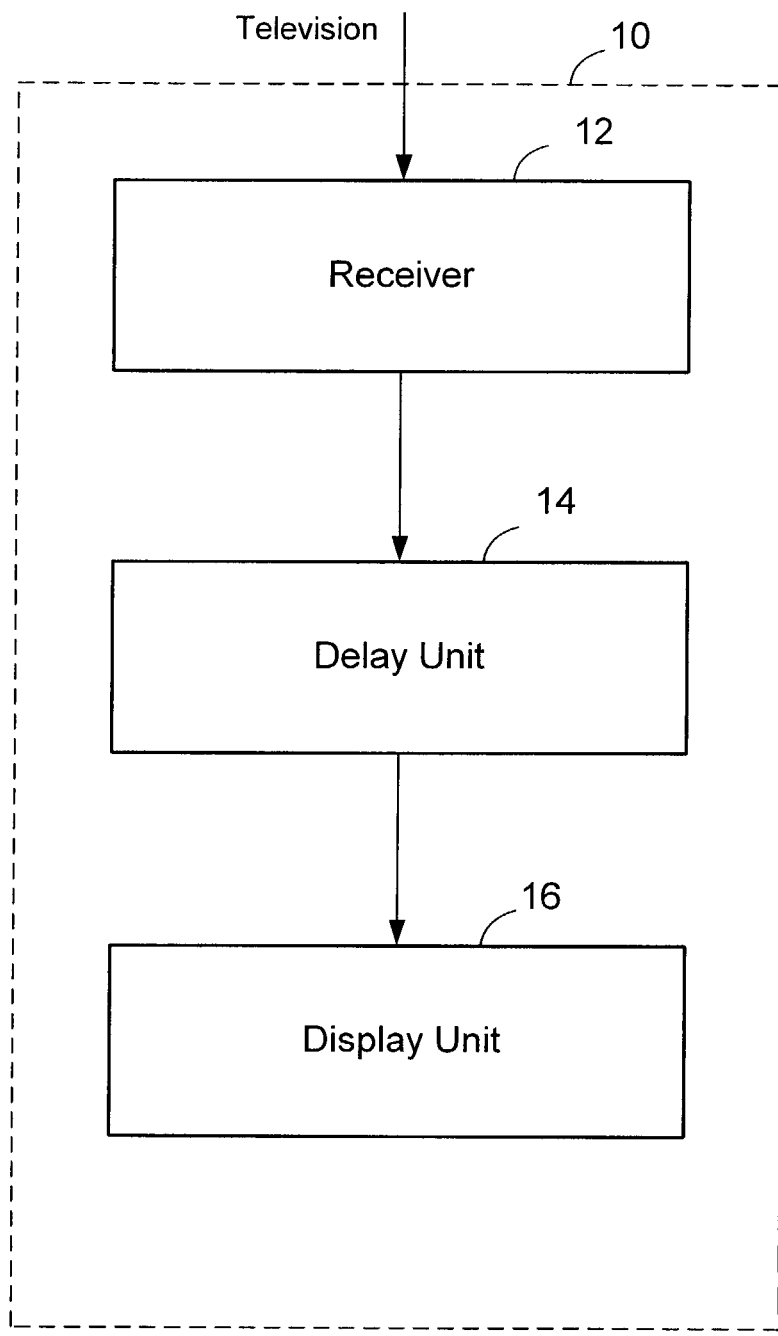
FIG. 1 is a block diagram illustrating a television with pause capability according to one embodiment of the present invention.

The embodiments of the present invention will be described below with reference to the accompanying drawings. Like reference numerals are used for like elements in the accompanying drawings.

FIG. 1 is a block diagram illustrating a television 10 with pause capability according to one embodiment of the present invention. The television 10 includes a receiver 12, a delay unit 14, and a display unit 16. The receiver 12 receives and tunes the television signal transmitted from a broadcasting station. The delay unit 14 will pass through the received television signal unchanged when the pause function is not activated. The delay unit 14 also encodes the received television signal in digital format and stores the encoded television signal in digital format while the pause function is activated. The delay unit 14 preferably uses non-spinning media such as a RAM (Random Access Memory) buffer for storing the encoded television signal. There are a variety of technical advantages in using a non-spinning media such as the RAM buffer 108 as the storage device. These technical advantages include reduced noise levels, fast response time, reliability, and low heat.

The delay unit 14 also decodes the stored television signal after the pause function is deactivated and the user wishes to view the television scenes stored during pause. During such time, the delay unit 14 will continue to store the incoming television signals so that they can be viewed at a time delayed from receipt. The delay unit 14 will resume passing through the received television signals unchanged, after the television signals stored in the delay unit 14 are depleted or becomes less than a predetermined threshold. The delay unit 14 will also resume passing through the received television signals unchanged under other circumstances such as (i) change of television station by the user, (ii) manual reset of the delay unit 14, or (iii) powering off the television, or the like.

The display unit 16 displays the decoded television signal. The display unit 16 includes a conventional display device such as a cathode ray tube, a liquid crystal display, a plasma display panel or the like, a speaker, and various control mechanisms to control the display device and the speaker. Since the delay unit 14 stores television signals received while the pause TV function is activated, the TV scenes received during the pause can be viewed at a later time without loss. In addition, all the components of the television 10 of the present invention are integrated into a single housing, and thus the television is user-friendly (users do not have to deal with combining multiple devices) and can be manufactured at a low cost using various integration technology such as SOC (system-on-chip) technology. Those skilled in the art would recognize that the pause capability of the present invention may be added to any number of existing designs of televisions without departing from the spirit of the claimed invention.

Figure 2:
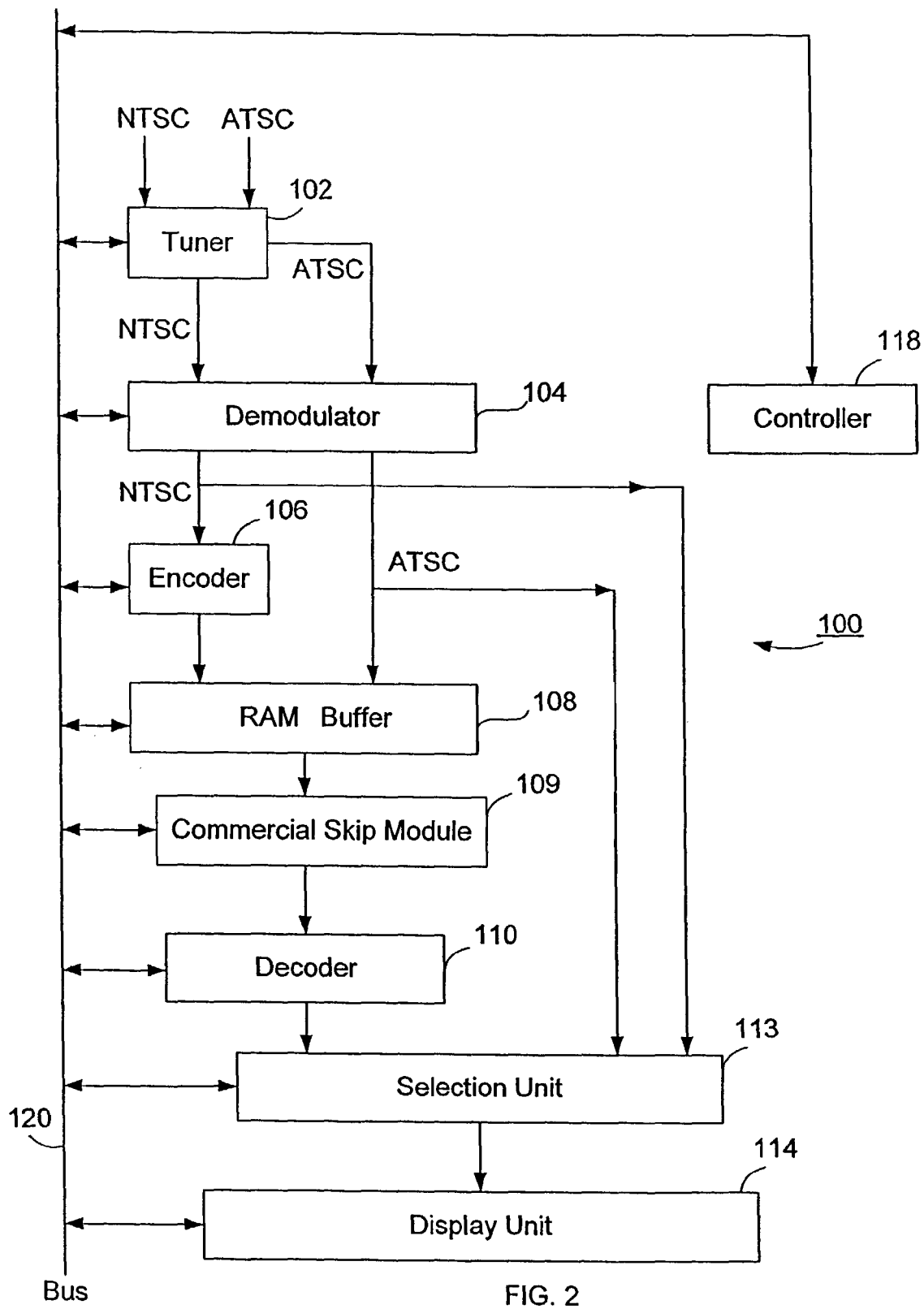
FIG. 2 is a block diagram illustrating a television with pause capability according to another embodiment of the present invention.

FIG. 2 is a block diagram illustrating a television 100 with pause capability according to another embodiment of the present invention. The television 100 includes a tuner 102, a demodulator 104, an encoder 106, a random access memory (RAM) buffer 108, a commercial skip module 109, a decoder 110, a selection unit 113, a display unit 114, a controller 118, and a bus 120. All the components of the television 100 are integrated into a single housing (not shown).

Referring to FIG. 2, the tuner 102 converts a carrier wave television signal (NTSC or ATSC) introduced by an antenna (not shown) or cable (not shown) into an intermediate frequency signal. The demodulator 104 is coupled to the tuner 102 and demodulates the television signal from the intermediate frequency signal. If the television signal is an analog NTSC signal, the encoder 106 which is coupled to the demodulator 104 receives the demodulated television signal and encodes it into a digital format, such as MPEG-1, MPEG-2, or MPEG-4 or any other digital format for encoding video data. If the television signal is a digital ATSC signal, then the encoder 106 does not have to encode the television signal.

The RAM buffer 108 is coupled to the demodulator 104 and the encoder 106 and stores the MPEG-encoded television signal or digital ATSC signal as it is output from the demodulator 104. The RAM buffer 108 can be a dynamic random access memory (DRAM), a static random access memory (SRAM), flash memory, or any other type of random access memory device that can store digital video data. The RAM buffer 108 preferably stores at least half an hour of video data, so that the pause function can continue for at least half an hour without losing any subsequent television scenes. However, it should be clear to one skilled in the art that any size of RAM buffer can be used for the television of the present invention. There are a variety of technical advantages in using a non-spinning media such as the RAM buffer 108 as the storage device. These technical advantages include reduced noise levels, fast response time, reliability, and low heat.

The decoder 110 is coupled to the RAM buffer 108 and decodes the MPEG-encoded television signal or digital ATSC signal stored in the RAM buffer 108 such that the decoded television signal is compatible with a conventional display and a conventional speaker (not shown).

The selection unit 113 is coupled to the decoder 110 and the demodulator 104 and receives the television signal (NTSC or ATSC) from the demodulator 104 and the decoded video signal from the decoder 110 to display the television signal. The selection unit 113 can select which television signal to pass through to the display unit 114, either the television signal from the demodulator 104 or the decoded video signal from the decoder 110. The controller 118 controls the selection unit 113 via the bus 120 such that the television signal from the demodulator 104 is selected during normal operation of the television 100 and the decoded video signal from the decoder 110 is selected if the user wants to view the television scenes stored while the pause function was activated. The display unit 114 is coupled to the selection unit 113 to receive the selected television signal, and includes a conventional display (not shown) such as a cathode ray tube (CRT) used in conventional televisions, a liquid crystal display, a plasma display panel, or any other type of display device. The display unit 114 also includes a conventional speaker (not shown) for producing sound corresponding to the television signal. The display unit 114 also has conventional control mechanisms for controlling the conventional display and speaker, such as control of contrast, color, brightness of the display or the volume of the speaker, etc.

The controller 118 controls all of the components of the television 100 via the bus 120. The bus 120 is used only for transmitting control signals to and from the controller 118. Video (television) data is transmitted via dedicated signal paths as shown in FIG. 2. The controller 118 controls the encoder 106, the commercial skip module 109, the decoder 110, the RAM buffer 108, the selection unit 113, and the display unit 114 to provide the pause function.

When the pause function of the TV receiver 100 is activated by using a pause key (not shown), the controller 118 causes the encoder 106 to start encoding and the RAM buffer 108 to start storing the encoded television signal. The controller 118 also controls the display unit 114 to display the same scene while the pause function is activated, and the RAM buffer 108 accumulates the encoded television signals as they are received. Since the RAM buffer 108 can preferably store at least half an hour of video data in one embodiment, the pause function can continue for at least half an hour without losing any television scenes.

Once the pause function is deactivated by the pause key (not shown), the controller 118 causes the decoder 110 to start decoding and the RAM buffer 108 to output the stored television data to the decoder 110. At the same time, the controller 118 causes the selection unit 113 to pass through the television signal received from the decoder 110. Thus, the display 114 displays video that was received by the tuner 102 a certain period of time ago, but is able to show all scenes without loss of any scenes received while the pause function was activated. Further, the RAM buffer 108 keeps storing additional encoded television data received while the previously stored television data in the RAM buffer 108 is displayed on the display 114, until certain conditions are met. Such conditions include, but are not limited to, (i) the television signals stored in the RAM buffer 108 being depleted or becoming less than a predetermined threshold, (ii) change of television station by the user, (iii) manual reset of the RAM buffer 108, and (iv) powering off the television. In this manner, the television 100 will be able to store television data received not only when the pause function is activated but also when the user views the television data stored during activation of the pause function.

The commercial skip module 109 provides commercial skip functions to the television 100 when the television data stored in the RAM buffer 108 is displayed on the display unit 114 by removing commercials from the television data. The user can skip commercials while watching the stored television data using the commercial skip module 109 that is controlled by the controller 118. When the commercial skip function is used, the amount of television data output from the RAM buffer 108 typically exceeds the amount of television data input to the RAM buffer 108. This makes it possible to deplete the RAM buffer 108 after passage of a certain period of time of viewing the television data stored in the RAM buffer 108. The details of providing a commercial skip function in digitally recorded television data are known in the art and are not necessary herein for an understanding of the present invention.

The controller 118 can also control the decoder 110 to provide fast-forward function when the user is viewing the television data stored in the RAM buffer 108. When fast-forward function is operated, the amount of television data output from the RAM buffer 108 typically exceeds the amount of television data input to the RAM buffer 108. This makes it possible to deplete the RAM buffer 108 after passage of a certain period of time of viewing the television data stored in the RAM buffer 108. The details of providing a fast-forward function in digitally recorded television data are known in the art and are not necessary herein for an understanding of the present invention.

Since the television of the present invention stores television data in a digital format while the pause function is activated, subsequent television scenes received while the pause function is activated are stored and can be viewed after the pause function is deactivated. The present invention also has the advantage that the image quality will not deteriorate when viewed after the pause function is deactivated, since the television data is stored in a digital format. Furthermore, the digital television data is stored in a random access memory, which is non-spinning media having the advantages of reduced heat, better reliability, and faster speed. In addition, all the components of the television of the present invention are integrated into a single housing, and thus the television is user-friendly (users do not have to deal with combining multiple devices) and can be manufactured at a low cost using various integration technology such as SOC (system-on-chip) technology. Those skilled in the art would recognize that the pause capability of the present invention may be added to any number of existing designs of televisions without departing from the spirit of the claimed invention.

Figure 3:
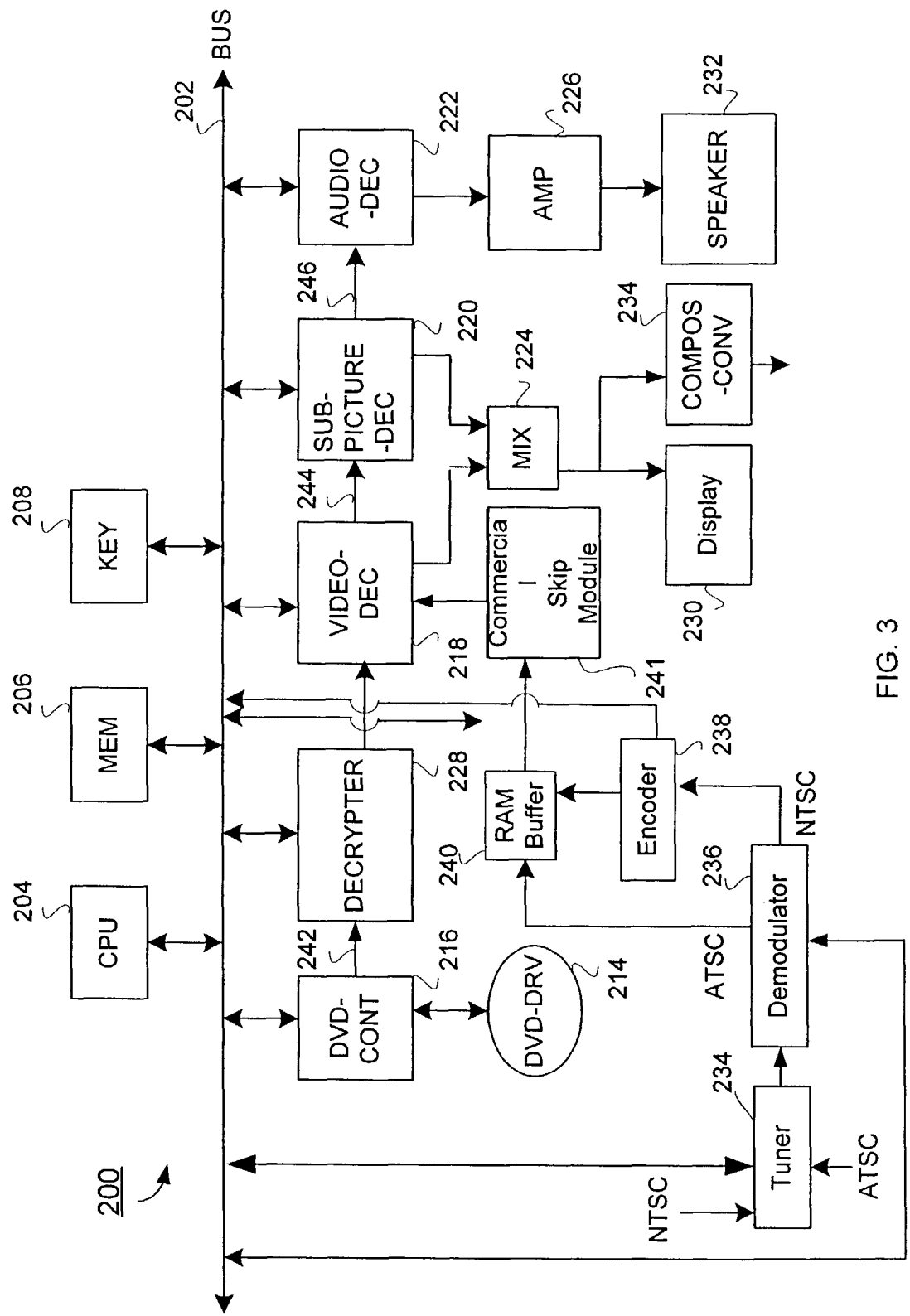
FIG. 3 is a block diagram illustrating a digital video disk (DVD) player with pause capability according to still another embodiment of the present invention.

FIG. 3 is a block diagram illustrating a digital video disk (DVD) player 200 with pause TV capability according to another embodiment of the present invention. Referring to FIG. 3, the DVD player of the present invention includes an internal system bus 202, a processor (CPU) 204, an internal memory (MEM) 206, a keypad (KEY) 208, a DVD driving mechanism (DVD-DRV) 214, a DVD controller (DVD-CONT) 216, a video decoder (Video-DEC) 218, a sub-picture decoder (Sub-Picture-DEC) 220, an audio decoder (Audio-DEC) 222, a video mixer (MIX) 224, an audio amplifier (AMP) 226, a decrypter 228, a display 230, a speaker 232, a composite converter (COMPOS-CONV) 234, a tuner 234, a demodulator 236, an encoder 238, a RAM buffer 240, and a commercial skip module 241. All the components except the tuner 234, the demodulator 236, the MPEG encoder 238, the RAM buffer 240, and the commercial skip module 233, and the processor 204 are typical components of a conventional DVD player and operate in a conventional manner. The processor 204 is modified from its conventional DVD player function so that it can also control the tuner 234, the demodulator 236, the MPEG encoder 238, the RAM buffer 240, and the commercial skip module 241 in order to provide the pause function. All the components of the DVD player 200 of the present invention are integrated into a single housing.

The processor (CPU) 204 controls all the components in the DVD player 200 via the internal system bus 202. The internal memory (MEM) 206 is a working memory for the processor 204 and stores a variety of programs such as a system control program executed by the processor 204. The keypad (KEY) 208 is provided with various keys for controlling the DVD player 200, including on/off keys, play, stop, forward, rewind, play TV, pause TV, and the like. The memory 206 also includes various control programs to provide these functionalities corresponding to the keys 208.

The DVD drive mechanism (DVD-DRV) 214 drives the DVD and picks up the video data from the DVD. The DVD controller (DVD-CONT) 216 controls the DVD drive mechanism (DVD-DRV) 214 under the control of the processor 204. The DVD controller (DVD-CONT) sends the DVD data read out of the DVD drive mechanism (DVD-DRV) 214 to the video decoder (Video-DEC) 218, the sub-picture decoder (SUB-PICTURE-DEC) 220, and the audio decoder (AUDIO-DEC) 222 via the DVD data dedicated signal paths 242, 244, 246. In addition, the decrypter 228 is provided on the DVD data dedicated signal path 242, which decrypts the data read out of the DVD in case they are encrypted. The operation of the decrypter 228 is well-known in the art.

The video decoder (Video-DEC) 218 extracts and decodes video data such as motion picture data from the DVD data received from the DVD controller (DVD-CONT) 216 via the DVD data dedicated signal path 242, and outputs decoded video data. The sub-picture decoder (SUB-PICTURE-DEC) 220 extracts and decodes sub-picture data from the DVD data received from the DVD controller (DVD-CONT) 216 via the DVD data dedicated signal path 244, and outputs still picture data. The audio decoder (AUDIO-DEC) 222 decodes audio data from the DVD data received from the DVD controller (DVD-CONT) 216 via the DVD data dedicated signal path 246, and outputs audio signal.

The video mixer (MIX) 224 mixes the video data decoded by the video decoder (MPEG-DEC) 218 and the sub-picture data decoded by the sub-picture decoder (SUB-PICTURE-DEC) 220 to generate an output video for display. The audio amplifier (AMP) 226 amplifies the audio signal decoded by the audio decoder (AUDIO-DEC) 222. The display (DISP) 230 displays the output video generated by the video mixer (MIX) 224. The display 230 can be a cathode ray tube (CRT) used in conventional TV receivers, a liquid crystal display, a plasma display panel, or any other type of display device. The speaker 232 produces sound corresponding to the audio signal amplified by the audio amplifier (AMP) 226.

The DVD player 200 may also be used so as to provide video and audio to an external display (not shown) and an external speaker (not shown). In this case, the display 230 and the speaker 232 in the DVD player 200 are optional components. The composite converter (COMPOS-CONV) 234 converts the output video data generated by the video mixer (MIX) 224 into an analog format or digital format compatible with conventional displays. The technical details of the composite converter (COMPOS-CONV) 234 are well-known in the art.

The DVD player 200 of the present invention is different from conventional DVD players in that it receives television signals, encodes the television signals according to a digital format, and stores the encoded television signal in a RAM buffer 240 in order to provide the pause function of the television scenes. Since a conventional DVD player already has a video decoder, the same video decoder can also be used for decoding the encoded television signal stored in the RAM buffer.

The tuner 234 converts a carrier wave television signal (NTSC or ATSC) introduced by an antenna (not shown) or cable (not shown) into an intermediate frequency signal. The demodulator 236 is coupled to the tuner 234 and demodulates the television signal from the intermediate frequency signal. If the television signal is an analog NTSC signal, the encoder 238 coupled to the demodulator 236 receives the demodulated television signal and encodes it into a digital format, such as MPEG-1, MPEG-2, or MPEG-4. If the television signal is a digital ATSC signal, then the encoder 238 does not have to encode the television signal.

The RAM buffer 240 is coupled to the demodulator 236 and the encoder 238 and stores the encoded television signal or digital ATSC signal output from the demodulator 236. The RAM buffer 240 outputs the stored television signal to the commercial skip module 241. The RAM buffer 240 can be a DRAM, SRAM, flash memory, or any other type of random access memory device that can store digital video data. The RAM buffer 240 preferably stores at least half an hour of video data, such that the pause function can continue for at least half an hour without loss of any subsequent television scenes. However, it should be clear to one skilled in the art that any size of random access memory can be used for the DVD player of the present invention.

The video decoder 218 is also coupled to the RAM buffer 240 via the commercial skip module 241 and decodes the encoded television signal or digital ATSC signal stored in the RAM buffer 240 as well as the DVD video data, such that the decoded television signal is compatible with a conventional display 230. The video decoder 218 has selection logic (not shown) that enables the video decoder 218 to select either the DVD video data received from the decrypter 228 or the television data stored in the RAM buffer 240 in response to a control signal from the controller 204. The selection logic (not shown) can be any type of circuitry that provides selects a particular input in response to a control signal. For example, a conventional multiplexer may be used as the selection logic (not shown). The audio decoder 222 decodes the audio data in the encoded television signal such that it is compatible with a conventional speaker 232.

The processor 204 controls all of the components of the DVD player 200 via the bus 202. In particular, the processor 204 controls the encoder 238 to start encoding and the RAM buffer 240 to store the encoded television data while the pause function is activated. The processor 204 also causes the display 230 to display the same scene while the pause function is activated. Since the RAM buffer 240 can preferably store at least half an hour of video data, the pause function can continue for at least half an hour without losing any television scenes.

When the pause function is deactivated, the processor 204 causes the decoder 218 to start decoding and the RAM buffer 240 to output the stored television signal to the decoder 218 via the commercial skip module 241. At the same time, the controller 204 causes the video decoder 218 to select and decode the television signal received from the RAM buffer 240. Thus, the display 230 displays video that was received by the tuner 234 a certain period of time ago, but is able to show all scenes without loss of any scenes received while the pause function was activated. Further, the RAM buffer 240 keeps storing additional encoded television data received while the previously stored television data in the RAM buffer 240 is displayed, until certain conditions are met. Such conditions include, but are not limited to, (i) the television signals stored in the RAM buffer 240 being depleted or becoming less than a predetermined threshold. (ii) change of television station by the user, (iii) manual reset of the RAM buffer 240, and (iv) powering off the DVD player 200. In this manner, the DVD player 200 will be able to store television data received not only when the pause function is activated but also when the television data stored while the pause function is activated is viewed by the user.

The commercial skip module 241 provides commercial skip functions when the television data stored in the RAM buffer 240 is displayed on the display 230 by removing commercials from the television data. The user can skip commercials while watching the stored television data using the commercial skip module 241 that is controlled by the controller (CPU) 204. When the commercial skip function is used, the amount of television data output from the RAM buffer 240 typically exceeds the amount of television data input to the RAM buffer 240. This makes it possible to deplete the RAM buffer 240 after passage of a certain period of time of viewing the television data stored in the RAM buffer 240. The details of providing a commercial skip function in digitally recorded television data are known in the art and are not necessary herein for an understanding of the present invention.

The controller (CPU) 204 can also control the video decoder 218 to provide fast-forward function when the user is viewing the television data stored in the RAM buffer 240. When fast-forward function is operated, the amount of television data output from the RAM buffer 240 typically exceeds the amount of television data input to the RAM buffer 240. This makes it possible to deplete the RAM buffer 240 after passage of a certain period of time of viewing the television data stored in the RAM buffer 240. The details of providing a fast-forward function in digitally recorded television data are known in the art and are not necessary herein for an understanding of the present invention.

Since the DVD player 200 of the present invention stores television data in a digital format while the pause function is activated, subsequent television scenes received while the pause function is activated are not lost and can be viewed after the pause function is deactivated. The present invention also has the advantage that the image quality will not deteriorate when the television scenes are viewed after the pause function is deactivated, since the television data is stored in a digital format. Furthermore, the digital television data is stored in a random access memory, which can be used almost permanently. Furthermore, since the DVD player 200 of the present invention uses the decoder 218 already existing in conventional DVD players, it can provide pause TV functionality without having to add a separate decoder. In addition, all the components of the DVD player of the present invention are integrated into a single housing, and thus the DVD player is user-friendly (users do not have to deal with combining multiple devices) and can be manufactured at a low cost using various integration technology such as SOC (system-on-chip) technology. Those skilled in the art would recognize that the pause capability of the present invention may be added to any number of existing designs of DVD players without departing from the spirit of the claimed invention.

Figure 4:
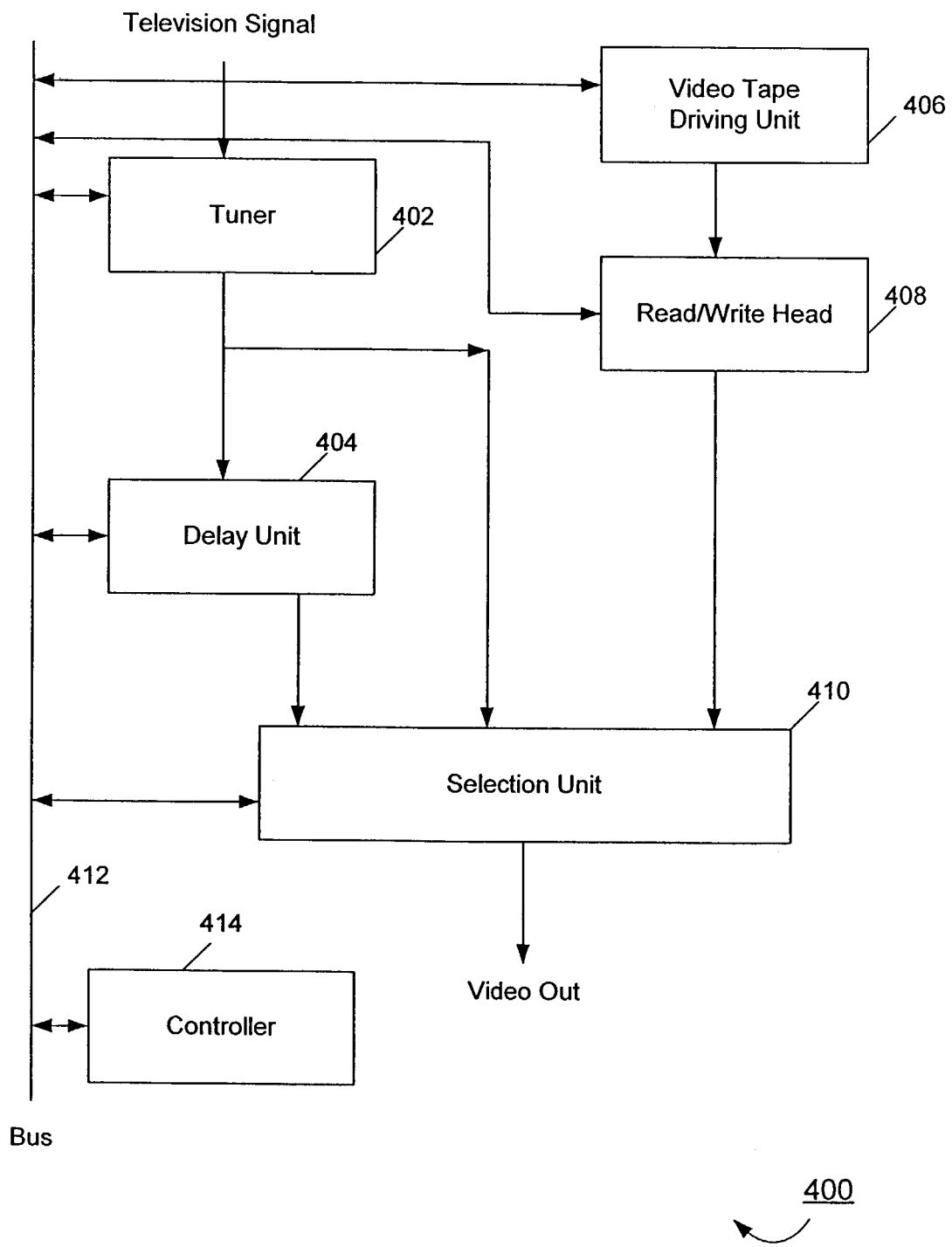
FIG. 4 is a block diagram illustrating a videocassette recorder (VCR) with pause capability according to still another embodiment of the present invention.

FIG. 4 is a block diagram illustrating a video cassette recorder (VCR) with pause capability according to still another embodiment of the present invention. The VCR 400 includes a read/write head 408, a video tape driving unit 406, a tuner 402, a delay unit 404, a selection unit 410, a bus 412, and a controller 414. All the components of the VCR 400 of the present invention are integrated into a single housing (not shown). The video tape driving unit 406 drives the video tape (not shown) so that the read/write head 408 can read video data from the video tape (not shown). The video data read by the read/write head 408 is input to the selection unit 410.

The tuner 402 receives the television signal and tunes to a single channel. The tuned television signal 402 is input to the selection unit 410 and to the delay unit 404. When the pause function is not activated, the delay unit 404 will not store any television signals, so only the television signals input to the selection unit 410 from the tuner 402 will be valid.

When the pause function is activated, the delay unit 404 stores the tuned television signal in digital format. The delay unit 404 also outputs the stored television signal after the pause function is deactivated and the user wishes to view the television scenes stored during the pause. Thus, the delay unit 404 includes an encoder (not shown) for encoding the television signal to a digital format, a random access memory buffer (not shown) for storing the encoded television signal, and a decoder for decoding the television signal (not shown).

The controller 414 controls the delay unit 404 to store the television signal in digital format only when the pause function is activated.

The controller 414 also controls the selection unit 410 to select which video data to output from the VCR 400. The selection unit 410 outputs video data from the video tape driving unit 408 when a video tape is played. The selection unit 410 outputs video data received from the tuner 402 when the VCR 400 is merely being used as a television receiver. The selection unit 410 outputs video data from the delay unit 404 when television scenes were stored during pause and the user wishes to view the stored television scenes.

When the pause function is activated, the controller 414 controls the encoder (not shown) in the delay unit 404 to start encoding television data and the RAM buffer (not shown) in the delay unit 404 to store the encoded television data while the pause function is activated. Also, the controller 414 controls the selection unit 410 to output the same television scene while the pause function is activated.

When the pause function is deactivated, the controller 414 causes the decoder (not shown) in the delay unit 404 to start decoding and the RAM buffer (not shown) in the delay unit 404 to output the stored television signal to the decoder (not shown). At the same time, the controller 414 causes the selection unit 410 to select the television signal received from the delay unit 410. Thus, the selection unit 410 outputs television data that was received by the tuner 402 a certain period of time ago, but is able to show all scenes without loss of any scenes received while the pause function was activated. Further, the RAM buffer (not shown) in the delay unit 404 keeps storing additional encoded television data received while the previously stored television data is displayed, until certain conditions are met. Such conditions include, but are not limited to, (i) the television signals stored in the delay unit 404 being depleted or becoming less than a predetermined threshold. (ii) change of television station by the user, (iii) manual reset of the RAM buffer (not shown) in the delay unit 404, and (iv) powering off of the VCR 400. In this manner, the VCR 400 will be able to store television data received not only when the pause function is activated but also when television data stored during activation of the pause function is viewed by the user.

As with the television and DVD player described in FIGS. 1-3, the VCR can also have commercial skip or fast-forward functions. In such case, the delay unit 404 will have capabilities to provide commercial skip or fast-forward functions. The details of providing commercial skip or fast-forward functions in digitally recorded television data are known in the art and are not needed herein for an understanding of the present invention.

All the components of the VCR 400 of the present invention are integrated into a single housing, and thus the VCR 400 is user-friendly (users do not have to deal with combining multiple devices) and can be manufactured at a low cost using various integration technology such as SOC (system-on-chip) technology. Those skilled in the art would recognize that the pause capability of the present invention may be added to any number of existing designs of VCRs without departing from the spirit of the claimed invention.

Figure 5:
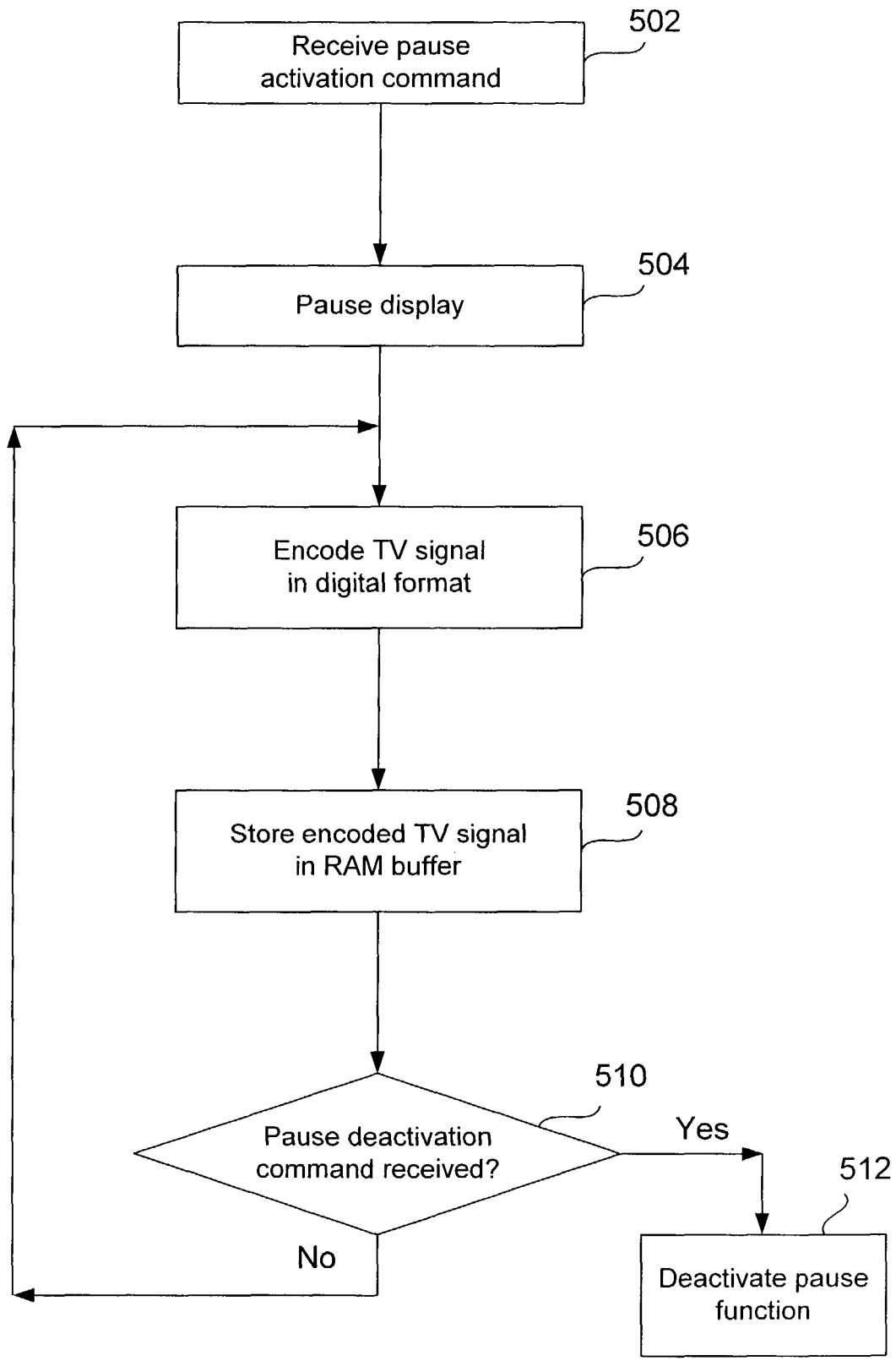
FIG. 5 is a flow chart illustrating the method of activating the pause function according to one embodiment of the present invention.

FIG. 5 is a flow chart illustrating the method of activating the pause function in an apparatus for viewing television with pause capability according to one embodiment of the present invention. The method illustrated in FIG. 5 is generally applicable to any of the apparatuses described in FIGS. 1-4 and can be implemented to be under control of a controller or processor in the apparatuses.

Referring to FIG. 5, the apparatus 100, 200, or 300 receives 502 a command to activate the pause function from a user. The command can be entered using a remote control (not shown) for the apparatus or a button (not shown) on the apparatus 100, 200, or 300 or in any other appropriate manner. Upon receipt of such command, the apparatus 100, 200, or 300 pauses 504 the television scene displayed on the display device 16, 114, or 230. Further, the encoder 106, 238, or 404 in the apparatus 100, 200, or 300 starts encoding 506 the television signal in digital format and stores 508 the encoded television signal in the RAM buffer 108, 240, or 404 of the apparatus 100, 200, or 300. If the RAM buffer 108, 240, or 404 is full, the apparatus 100, 200, or 300 may overwrite the television signal beginning with the television signal stored earlier, in one embodiment. The encoding and storing of the television data in digital format is performed as described above with reference to FIGS. 1-4. Then, the apparatus 100, 200, or 300 determines 510 whether a pause deactivation command was received. The pause deactivation command can be input by the user or by a control signal from other components in the apparatus 100, 200, or 300. If the pause deactivation command was not received, the process returns to step 506 to keep pausing the display and encoding and storing the newly received television signals. If the pause deactivation command was received, the apparatus deactivates 512 the pause function. The method of deactivating the pause function is explained in detail below with reference to FIG. 6.

Figure 6:
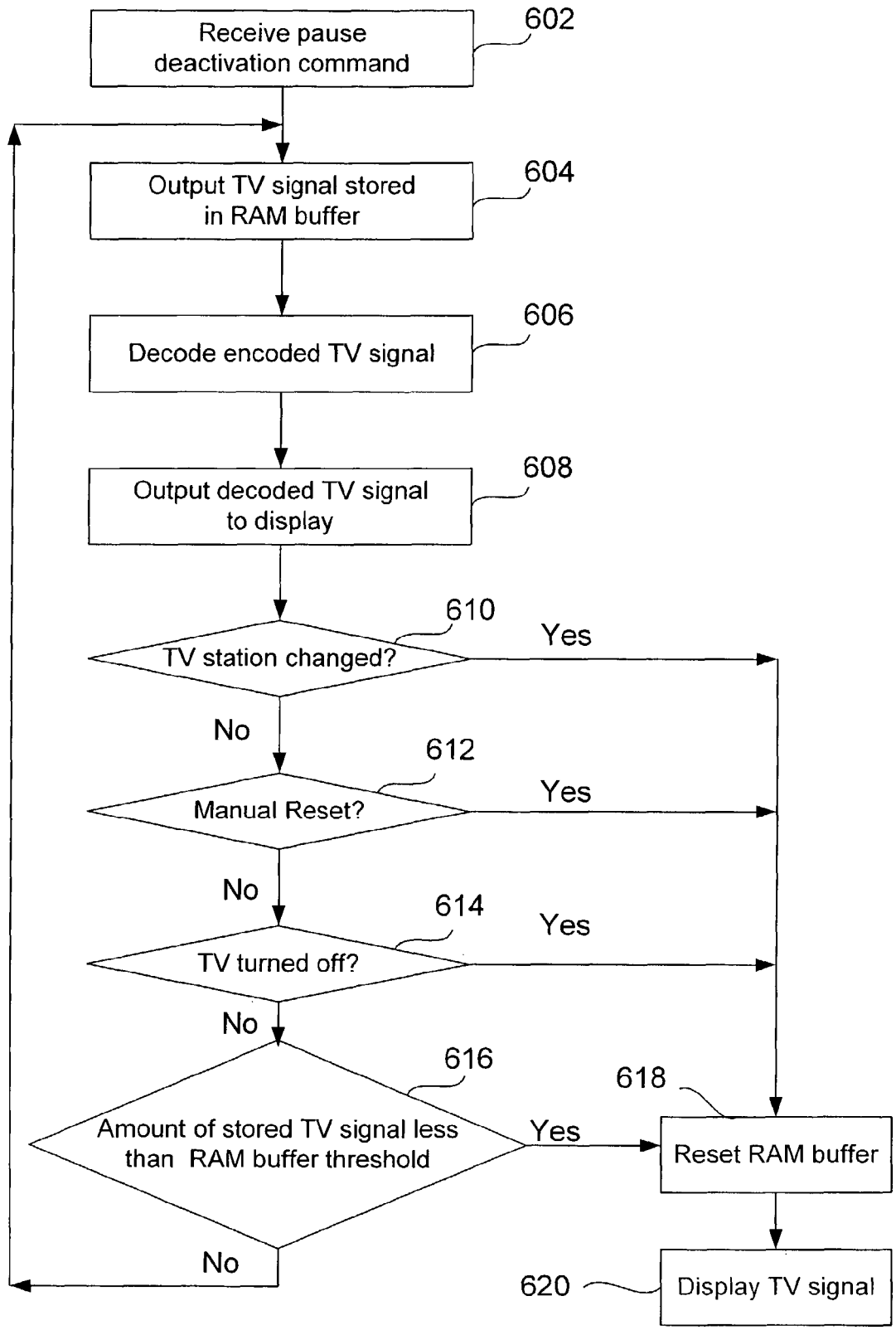
FIG. 6 is a flow chart illustrating the method of deactivating the pause function according to one embodiment of the present invention.

FIG. 6 is a flow chart illustrating the method of deactivating the pause function in an apparatus for viewing television with pause capability according to one embodiment of the present invention. The method illustrated in FIG. 5 is generally applicable to any of the apparatuses described in FIGS. 1-4 and can be implemented to be under control of a controller or processor in the apparatus. When the user of the apparatus deactivates the pause function, the user will want to view the television scenes that he or she missed viewing during activation of the pause function. However, the user may also have no need to view the television scenes that he or she missed for various reasons. For example, the user may want to view another channel or feel that nothing he or she missed was important. The user may also simply turn off the power of the apparatus, obviating the need to show the stored television scenes. The method described in FIG. 6 accommodates such needs of the user by showing the stored television scenes to the user while giving the user the option not to view such stored scenes.

Referring to FIG. 6, the apparatus 100, 200, or 300 receives 602 the deactivation command from the user. Once the deactivation command is received, the apparatus 100, 200, or 300 starts outputting 604 the television signal stored in its RAM buffer 108, 240, or 404 and decoding 606 the television signal. The television signal stored in the RAM buffer 108, 240, or 404 is output in such an order that the television signal stored earlier is output earlier (First-In-First-Out (FIFO). The decoded television signal is output 608 to a display unit 114 or 230 so that the user can view the television scenes stored during activation of the pause function. The apparatus 100, 200, or 300 keeps encoding and storing the television data received while viewing the previously stored television data.

While displaying the stored television scenes stored during activation of the pause function, the apparatus 100, 200, or 300 checks whether or not the user wishes to stop viewing such stored scenes by determining whether certain reset conditions are met. Such reset conditions include, but are not limited to, (i) whether the television channel (station) was changed (step 610), (ii) whether a command to manually reset the RAM buffer 108, 240, or 404 was entered (step 612), (iii) whether the power of the apparatus 100, 200, or 300 was turned off (step 614), or (iv) the amount of television data stored in the RAM buffer 108, 240, or 404 is less than a predetermined threshold (step 616). The threshold for the RAM buffer 108, 240, or 404 is selected to be larger than at least the amount of television data required to show a meaningful television scene, and is typically a very small value. However, it should be clear to one skilled in the art that any value can be used for the RAM buffer threshold.

If any of the above reset conditions are met, than the apparatus 100, 200, or 300 resets 618 the RAM buffer 108, 240, or 404 to delete the television scenes stored therein and displays 620 the television signals in the channel designated by the user as they are received. In another embodiment of the present invention, the RAM buffer 108, 240, or 404 is not reset even if the above reset conditions are met. Rather, the television data stored in the RAM buffer 108, 240, or 404 remains so that the user can view the stored television data at a later time. In such case, the RAM buffer 108, 240, or 404 can be reset at a later time when there is not enough storage to store television signals during re-activation of the pause function.

According to the method of activating and deactivating the pause function described in FIGS. 5 and 6, the user can activate the pause function by simply activating a control button. The method of present invention automatically enables encoding and storing of the television data in digital format. In addition, the deactivation of the pause function can be carried out also by simply using a control button. The stored television data will be automatically decoded and shown without any further action. There is no delay in viewing the stored television data, nor is there a need to rewind tapes or other storage media storing the television data. Also, the user may start watching the stored television before the broadcast television program is over, since even the subsequently broadcast television program will still be encoded and stored while the user views the previously stored television data.

Although the present invention has been described above with respect to several embodiments, various modifications can be made within the scope of the present invention. For example, the type of random access memory used can be changed as long as it can store digital video data and has an operating speed fast enough to reproduce digital video data. The display device and the speaker can be of any type, and can be integrated to the apparatus or be an external device. Furthermore, any type of encoding technique can be used to encode the television signals for storage to the random access memory buffers as long as it encodes the television signals in a digital format such as MPEG-1, MPEG-2, or MPEG-4. Also, any other conditions can be imposed to reset the RAM buffer when the pause function is deactivated. In addition, the DVD player 200 of FIG. 3 can be combined with a conventional VCR to provide a DVD/VCR combo unit, and likewise, the VCR 400 of FIG. 4 can be combined with a conventional DVD player to provide DVD/VCR combo unit. Accordingly, the disclosure of the present invention is intended to be illustrative, but not limiting, of the scope of the present invention, which is set forth in the following claims.

What is claimed is:

1. A television comprising:
a receiver configured for receiving a television signal;
a delay unit configured for encoding the received television signal in digital format and storing the encoded television signal in response to an activation command input by a user to activate a pause function, and decoding the stored television signal in response to a deactivation command input by the user to deactivate the pause function; and
a display unit configured for displaying the decoded television signal.

2. The television of claim 1, wherein the digital format is MPEG-2 format.

3. The television of claim 1, wherein the delay unit comprises a random access memory buffer for storing the encoded television signal.

4. The television of claim 1, wherein the receiver, the delay unit, and the display unit are integrated into a single housing.

5. A television comprising:
a tuner configured for receiving a multi-channel television signal and outputting a single channel television signal selected from the multi-channel television signal;
a demodulator coupled to the tuner, the demodulator configured for demodulating the single channel television signal;
a random access memory buffer coupled to the demodulator, the random access memory buffer configured for temporarily storing the demodulated television signal in response to an activation command input by a user to activate a pause function and for outputting the stored television signal in response to a deactivation command input by the user to deactivate the pause function;
a decoder coupled to the random access memory buffer, the decoder configured for decoding the stored television signal output from the random access memory buffer; and
a display coupled to the decoder, the display configured for displaying the decoded television signal.

6. The television of claim 5, further comprising a controller coupled to the random access memory buffer and the decoder, the controller causing the random access memory buffer to store the demodulated television signal in response to activation of the pause function.

7. The television of claim 6, wherein the controller causes the random access memory buffer to output the stored television signal and the decoder to decode the output television signal in response to the deactivation command.

8. The television of claim 6, wherein the controller provides a fast-forward function to the random access memory buffer and the decoder.

9. The television of claim 5, further comprising an encoder coupled to the demodulator and the random access memory buffer for encoding the demodulated television signal into a digital format in response to the activation command, the random access memory buffer storing the encoded television signal in digital format.

10. The television of claim 9, wherein the digital format is MPEG-2 format.

11. The television of claim 5, further comprising:
a commercial skip module coupled to the random access memory buffer and the decoder, the commercial skip module removing commercials from the television signal output from the random access memory buffer.

12. The television of claim 5, wherein the display is one selected from the group consisting of a cathode ray tube, a liquid crystal display, and a plasma display panel.

13. The television of claim 5, wherein the tuner, the demodulator, the random access memory buffer, the decoder, and the display are integrated into a single housing.

14. The television of claim 5, wherein the random access memory buffer is one selected from the group consisting of a dynamic random access memory (DRAM) buffer, a static random access memory buffer (SRAM), and a flash memory buffer.

15. The television of claim 5, wherein the random access memory buffer stores the television signal playable for at least half an hour.

16. A digital video disk (DVD) player comprising:
a tuner configured for receiving a multi-channel television signal and outputting a single channel television signal selected from the multi-channel television signal;
a demodulator coupled to the tuner, the demodulator configured for demodulating the single channel television signal;
an encoder coupled to the demodulator, the encoder configured for encoding the single channel television signal in digital format to generate digital television data;
a random access memory buffer coupled to the encoder, the random access memory buffer configured for temporarily storing the digital television data in response to an activation command input by a user to activate a pause function and for outputting the stored digital television data in response to a deactivation command input by the user to deactivate the pause function;
a DVD driver configured for driving a digital video disk and receiving digital DVD data from the digital video disk; and
a decoder coupled to the random access memory buffer and the DVD driver, the decoder configured for decoding the digital television data and the digital DVD data.

17. The digital video disk player of claim 16, further comprising a controller coupled to the random access memory buffer, the controller causing the random access memory buffer to store the digital television data in response to activation of the pause function.

18. The digital video disk player of claim 17, wherein the controller causes the random access memory buffer to output the digital television data and the decoder to decode the digital television data in response to the deactivation command.

19. The digital video disk player of claim 17, wherein the controller provides a fast-forward function to the random access memory buffer and the decoder.

20. The digital video disk player of claim 16, further comprising:
a display coupled to the decoder for displaying the decoded television video data and the decoded DVD video data.

21. The digital video disk player of claim 20, wherein the display is one selected from the group consisting of a cathode ray tube, a liquid crystal display, and a plasma display panel.

22. The digital video disk player of claim 16, wherein the tuner, the demodulator, the random access memory buffer, the DVD driver, and the decoder are integrated into a single housing.

23. The digital video disk player of claim 16, wherein the digital format is MPEG-2 format.

24. The digital video disk player of claim 16, wherein the random access memory buffer is one selected from the group consisting of a dynamic random access memory (DRAM) buffer, a static random access memory (SRAM) buffer, and a flash memory buffer.

25. The digital video disk player of claim 16, wherein the random access memory buffer stores digital television data playable for at least half an hour.

26. The digital video disk player of claim 16, further comprising:
a commercial skip module coupled to the random access memory buffer and the decoder, the commercial skip module removing commercials from the television data output from the random access memory buffer.

27. The digital video disk player of claim 16, wherein a video cassette recorder is combined with the digital video disk player.

28. A video cassette recorder comprising:
a video head configured for reading video data recorded on a video tape;
a tuner configured for receiving a television signal; and
a delay unit coupled to the tuner, the delay unit configured for encoding the television signal in digital format and storing the digitally encoded television signal in response to an activation command input by a user to activate a pause function, and for decoding the digitally encoded television signal and outputting the decoded television signal in response to a deactivation command input by the user to deactivate the pause function, the video cassette recorder outputting either the video data read from the video head or the decoded television signal.

29. The video cassette recorder of claim 28, further comprising a selection unit that selects as an output of the video cassette recorder either the video data read by the video head or the television signal output from the delay unit.

30. The video cassette recorder of claim 28, further comprising a controller coupled to the delay unit, the controller causing the delay unit to store the television signal in digital format in response to the activation command.

31. The video cassette recorder of claim 30, wherein the controller causes the delay unit to output the stored television signal in response to the deactivation command.

32. The video cassette recorder of claim 28, wherein the digital format is MPEG-2 format.

33. The video cassette recorder of claim 28, wherein the delay unit comprises one selected from the group consisting of a dynamic random access memory (DRAM) buffer, a static random access memory (SRAM) buffer, and a flash memory buffer.

34. The video cassette recorder of claim 28, wherein the delay unit stores the television signal in digital format playable for at least half an hour.

35. The video cassette recorder of claim 28, wherein a digital video disk player is combined with the video cassette recorder.

36. A method of providing a pause function in an apparatus, the method comprising:
receiving a pause function activation command;
pausing display of television scenes in response to receipt of the pause function activation command input by a user;
encoding television signals received by the apparatus in digital format in response to receipt of the pause function activation command; and
storing the encoded television signal in the apparatus.

37. The method of claim 36, further comprising:
determining whether a pause function deactivation command was received; and
responsive to receipt of the pause function deactivation command, deactivating the pause function.

38. The method of claim 37, wherein deactivating the pause function comprises:
outputting the stored television signal; and
decoding the television signal.

39. The method of claim 38, wherein deactivating the pause function further comprises:
determining whether a change of television station occurred; and responsive to change of the television station, displaying television signals as they are received.

40. The method of claim 38, wherein deactivating the pause function further comprises:

determining whether a manual reset command was received; and responsive to receipt of the manual reset command, displaying television signals as they are received.

41. The method of claim 38, wherein deactivating the pause function further comprises:

determining whether the amount of television signal stored in the apparatus is less than a predetermined threshold; and responsive to the amount being less than the threshold, displaying television signals as they are received.

42. A receiver for receiving a television signal, the receiver comprising:

a delay unit, wherein the delay unit is configured to encode the received television signal in digital format and store the encoded television signal in response to an activation command input by a user to activate a pause function, and decode the stored television signal in response to a deactivation command input by the user to deactivate the pause function.

43. The receiver of claim 42, wherein the digital format is MPEG-2 format.

44. The receiver of claim 42, wherein the delay unit comprises a random access 2 memory buffer for storing the encoded television signal.

45. The receiver of claim 42, wherein the receiver and the delay unit are integrated into a single housing.

\* \* \* \* \*